United States Patent [19]

Jones

[11] 4,028,964
[45] June 14, 1977

[54] SPEED REDUCER BOX FOR DRIVING A PUMP JACK

[75] Inventor: Gomer W. Jones, Rose Hill, Kans.

[73] Assignee: Bird Oil Equipment Ltd., Calgary, Canada

[22] Filed: Jan. 14, 1976

[21] Appl. No.: 648,934

[52] U.S. Cl. .................... 74/606 R; 74/216.5; 74/219; 74/226; 74/242.1 R

[51] Int. Cl.² .................... F16H 57/02; F16H 7/06; F16H 7/12

[58] Field of Search ............. 74/606, 216.5, 219, 74/242.1 A, 242.15 R, 226, 242.1 R

[56] References Cited

UNITED STATES PATENTS

| | | | |
|---|---|---|---|
| 646,467 | 4/1900 | Short | 74/606 |
| 1,360,032 | 11/1920 | Schiffner | 74/219 |
| 1,988,421 | 1/1935 | McCann et al. | 74/219 |
| 2,121,080 | 6/1938 | Galkin | 74/242.1 A |
| 2,155,108 | 4/1939 | Wave | 74/219 |
| 2,171,158 | 8/1939 | McCann | 74/219 |
| 2,196,479 | 4/1940 | Sloan | 74/242.1 A |
| 3,563,110 | 2/1971 | Hauser | 74/473 R |
| 3,572,147 | 3/1971 | Obenshain | 74/219 |

FOREIGN PATENTS OR APPLICATIONS 1,346,369  4/1902  France ........................ 74/216.5

*Primary Examiner*—Samuel Scott
*Assistant Examiner*—Allan R. Burke
*Attorney, Agent, or Firm*—John H. Widdowson; Edwin H. Crabtree

[57] ABSTRACT

An improved light weight speed reducer box for driving an oil pump jack and reducing the speed from a drive motor or the like to the pump jack. The speed reducer box includes reversible chain driven sprockets mounted on an input shaft, idle shaft, and output shaft. By mounting the shafts between a separate upper and lower housing, maintenance can be quickly performed on the speed reducer box.

4 Claims, 4 Drawing Figures

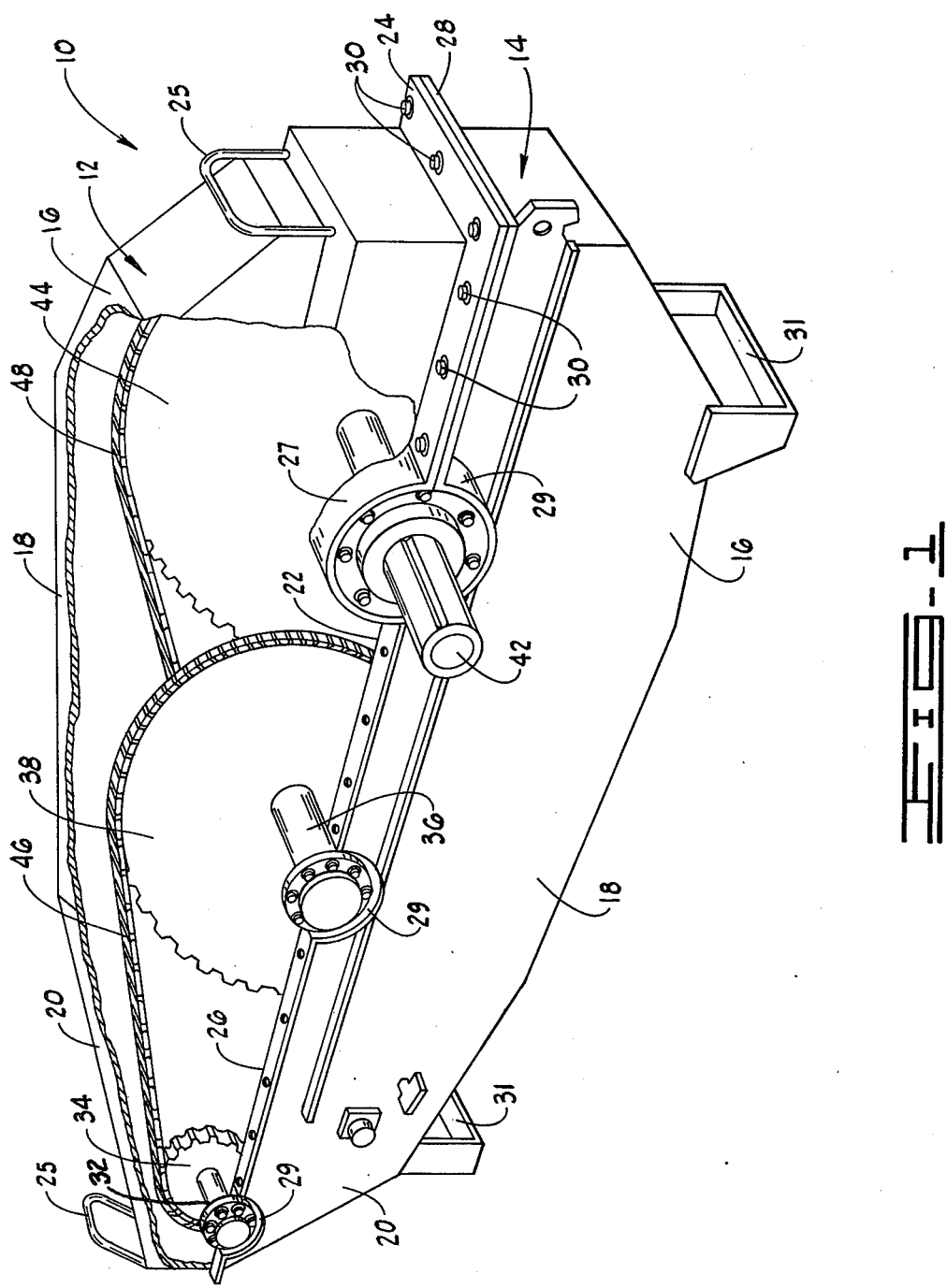

SPEED REDUCER BOX FOR DRIVING A PUMP JACK

BACKGROUND OF THE INVENTION

This invention relates generally to speed reducers and more particulary but not by way of limitation to an improved speed reducer box used in driving an oil pump jack.

Heretofore oil pump jacks have been driven by a drive motor or the like using a gear box for reducing the speed between the drive motor and the pump jack. Under normal pumping conditions the average horse power requirement of the drive motor is between 20 to 65 HP at speeds of 400 to 1200 rpm. The gear box reduces the speed a ratio of approximately 30 to 1. Due to the high torque reversal between the lifting of the polish rod load and the counterweight load, the gear box is subjected to a gear slap. The gear slap causes accelerated wear of the gear teeth thereby greatly reducing the life of the gear box.

Pump jacks have used chain driven speed reducers for reducing the speed from a drive motor but none of the prior art speed reducers disclose the novel features of the subject speed reducer box and its advantages as disclosed herein.

SUMMARY OF THE INVENTION

The subject invention eliminates gear slap by using chain driven sprockets rather than gears in reducing the speed ratio between the drive motor and pump jack.

The improved speed reducer box is light weight, portable, and simple in design for ease in performing maintenance on the box in the field.

The chain driven sprockets are reversible on their respective shafts so that sprocket life can be extended when wear becomes excessive on one side of the sprocket teeth.

The input shaft, idle shaft, and output shaft are mounted on bearings riding in a bearing housing. The bearing housings are attached to each side of a separate upper and lower housing so that the upper housing can quickly be unbolted from the lower housing and the shafts removed, the shaft bearings replaced, or the sprockets reversed.

The improved speed reducer box includes a chain tightener mounted in the lower housing and biasing the sprocket chains to prevent excessive slack in the chains.

The speed reducer box also includes a brake for stopping the speed reducer box when the drive motor is shut down so that the pump jack can be held in a desired position for performing maintenance thereon.

The speed reducer box includes an elongated housing having an input shaft, idle shaft, and an output shaft rotatably mounted therein. Attahed to the input shaft is a high speed input shaft sprocket. Attached to the idle shaft is a low speed idle shaft sprocket and a high speed idle shaft sprocket. Attached to the output shaft is a low speed output shaft sprocket. An endless high speed sprocket chain connects the high speed input shaft sprocket to the low speed idle shaft sprocket. An endless low speed sprocket chain connects the high speed idle shaft sprocket to the low speed output shaft sprocket.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the improved speed reducer box.

DETAILED DESCRIPTION OF THE DRAWINGS

Figure 1A:
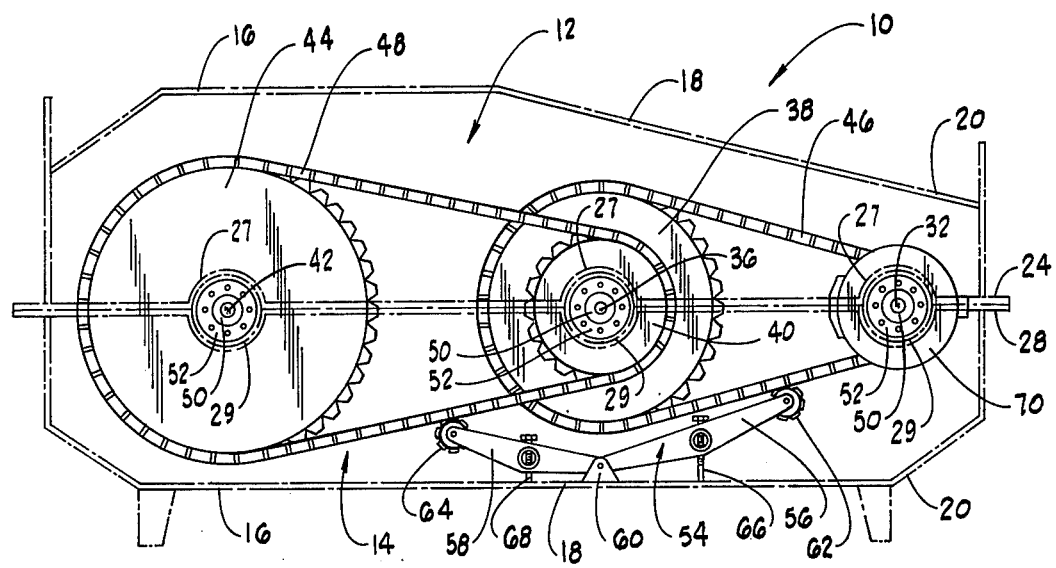
FIG. 1a is a side view of the speed reducer box.

In FIG. 1 the improved speed reducer box is designated by general reference numeral 10. The box 10 includes an upper housing 12 and a lower housing 14. The upper housing 12 and the lower housing 14 include a front portion 16, a center portion 18, and a rear portion 20. The upper housing 12 has an open bottom portion 22 with a flange 24 therearound. The upper housing includes lifting eyes 25 attached to the front portion 16 and the rear portion 20 for lifting the box 10.

The lower housing 14 has an open top portion 26 with a flange 28 therearound. The flanges 24 and 28 are bolted together by bolts 30 thereby securing the upper housing 12 to the lower housing 14 and by removing the bolts 30 the upper housing 12 can be quickly removed for performing maintenance on the box 10. The upper housing 12 and the lower housing 14 further include adjacent semi-circular flange portions 27 and 29 for receiving bearing housings therein and bolting the housings to the sides of the flanges. The lower housing also includes a U-shaped base 31 positioned under the front portion 16 and rear portion 20 for resting the box 10 on the pump jack platform.

A high speed input shaft 32 is rotatably attached to the rear portion 20 of the housings 12 and 14. A high speed input shaft sprocket 34 is mounted on the shaft 32. The input shaft 32 is driven by a drive motor or the like. The drive motor is not shown in the drawings.

An idle shaft 36 is rotatably attached to the center portion 18 of the housings 12 and 14. A low speed idle shaft sprocket 38 and a high speed idle shaft sprocket 40 are mounted on the idle shaft 36. The high speed idle shaft sprocket 40 is shown in FIG. 1a.

A low speed output shaft 42 is rotatably attached to the front portion 16 of the housings 12 and 14. A low speed output shaft sprocket 44 is mounted on the output shaft 42. The output shaft 42 extends outwardly from both sides of the box 10 for rotatably driving a pair of pump jack counterweights which are not shown in the drawings and in operation are used in raising and lowering the polish rod load in the pumping of oil.

An endless high speed sprocket chain 46 connects the high speed input shaft sprocket 34 and the low speed idle shaft sprocket 38. An endless low speed sprocket chain 48 which is greater in width than the high speed sprocket chain 46 connects the high speed idle shaft sprocket 40 and the low speed output shaft sprocket 44.

In FIG. 1a the box 10 is shown with the upper housing 12 and the lower housing 14 shown in dashed lines to expose the chain driven sprockets. The input shaft 32, the idle shaft 36, and the output shaft 42 are shown mounted on bearings 50. The bearings 50 are mounted inside bearing housings 52. The lower portion of the bearing housings 52 is bolted to the semi-circular flange portion 29 of the lower housing 14 and the upper portion of the bearing housings 52 are bolted to the semicircular flange portion 27 of the upper housing 12. By removing the bolts from the bearing housings the bearings 50 can be quickly replaced. Also at this time the sprockets 34, 38, and 44 can be removed from their respective shafts and reversed when the wear becomes excessive on one side of the sprocket teeth. By reversing the sprockets on their shafts the wear life of the box 10 can be extended.

Mounted on the bottom of the lower housing 14 and positioned in the center portion 18 is a chain tightener 54. The chain tightener 54 includes a pair of chain tightening arms 56 and 58. The tightening arms 56 and 58 are pivotally attached at one end to a pivot housing 60. At the other end of the arms 56 and 58 are chain tightening sprockets 62 and 64. The chain tightening sprocket 62 is biased against the high speed sprocket chain 46 by a threaded bolt 66 which adjusts the tightening arm 56 up and down. Likewise the chain tightening sprocket 64 is biased against the low speed sprocket chain 58 by a threaded bolt 68 which adjusts the tightening arm 58 up and down. By adjusting the tightening arms 56 and 58 the amount of slack in the chains 46 and 48 can be controlled.

Attached to the input shaft 32 is a brake 70. The brake 70 is operated manually and is used to stop the box 10 when the drive motor is shut down so that the connected pump jack can be held in a fixed position by the speed reducer box 10 so that maintenance can be performed on the pump jack.

Figure 2:
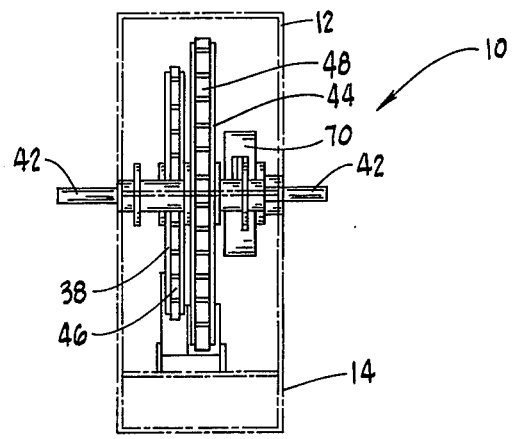
FIG. 2 is a front view of the speed reducer box.

In FIG. 2 a front view of the box 10 is seen. In this view it can be seen that the low speed sprocket chain 48 is larger in width than the high speed sprocket chain 46. The greater width of the low speed sprocket chain 48 is required because of the high torque load placed on the output shaft 42 and low speed output shaft sprocket 44 during the operation of the pump jack. The lower housing 14 is filled with lubricating oil for splash lubrication of the sprockets, chains and bearings.

Figure 3:
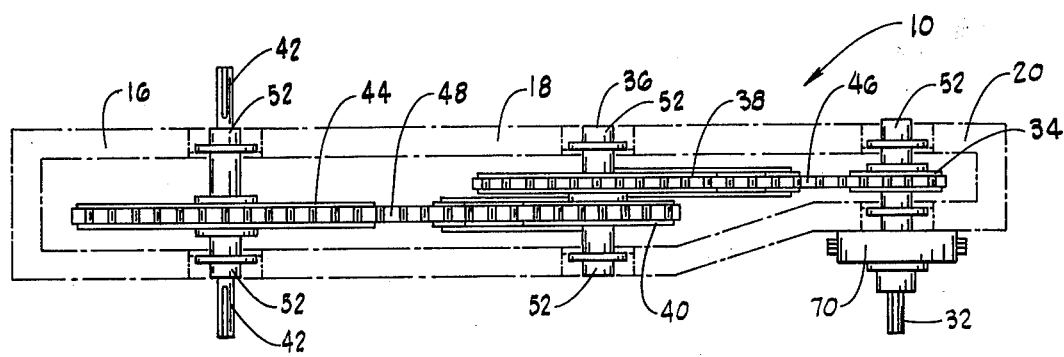
FIG. 3 is a top view of the speed reducer box.

In FIG. 3 a top view of the box 10 is shown. In this view the bearing housings 52 can be seen more clearly mounted on both sides of the input shaft 32, idle shaft 36, and output shaft 42. The rear portion 20 of the box 10 can be seen tapered inwardly so that the brake 70 can be mounted on the input shaft 32 without restricting the clearance of the pump jack counterweights which are attached to the output shaft 42 and rotate adjacent both sides of the box 10.

Changes may be made in the construction and arrangement of the parts or elements of the embodiments as disclosed herein without departing from the spirit or scope of the invention as defined in the following claims.

I claim:

1. A speed reducer box for driving a pump jack, the box attached to a drive motor or the like and reducing the speed therefrom to the pump jack, the box comprising:
   an elongated housing having a front portion, a center portion, and a rear portion, said housing further including a separate upper housing and a separate lower housing so that said upper housing can be removed for performing maintenance on the speed reducer box;
   an input shaft rotatably attached to the rear portion of said lower housing and said upper housing, said input shaft rotatably attached to the drive motor;
   an input shaft sprocket mounted on said input shaft;
   an idle shaft rotatably attached to the center portion of said lower housing and said upper housing;
   a first idle shaft sprocket and a second idle shaft sprocket mounted on said idle shaft;
   an output shaft rotatably attached to the front portion of said lower housing and said upper housing, said output shaft rotatably attached to the pump jack;
   an output shaft sprocket mounted on said output shaft;
   a first endless sprocket chain connecting said input shaft sprocket and said first idle shaft sprocket for driving said idle shaft;
   a second endless sprocket chain connecting said second idle shaft sprocket and said output shaft sprocket for driving said output shaft; and
   a chain tightener having a pair of chain tightening arms attached at one end to a pivot housing, said pivot housing attached to the bottom of said lower housing, the other end of said tightening arms attached to chain tightening sprockets, said chain tightening sprockets biased against said first sprocket chain and said second sprocket chain to tighten said chains when the speed reducer box is in operation.

2. The box as described in claim 1, wherein said sprocket chains mesh against one side of the sprocket teeth of said sprockets during the operation of the speed reducer box, said sprockets being reversable on their respective shafts so that when the wear on one side of the teeth becomes excessive, said sprockets may be reversed on said shaft and the opposite sides of the sprocket teeth mesh against said sprocket chains thereby extending the wear life of said sprockets.

3. The box as described in claim 1 wherein, said input shaft, said idle shaft, and said output shaft include bearings mounted in bearing housings, a lower portion of said bearing housings removably attached to the top of said lower housing, the upper portion of said bearing housings removably attached to the bottom portion of the upper housing.

4. The box as described in claim 1 further including brake means attached to said input shaft for stopping the speed reducer box and holding the connected pump jack in a desired position so that maintenance can be performed thereon.

* * * * *

UNITED STATES PATENT AND TRADEMARK OFFICE
CERTIFICATE OF CORRECTION

PATENT NO. : 4,028,964
DATED : June 14, 1977
INVENTOR(S) : Gomer W. Jones

It is certified that error appears in the above-identified patent and that said Letters Patent are hereby corrected as shown below:

Column 3, line 22, delete "58" and insert therefore --- 48 ---.

Signed and Sealed this

Thirty-first Day of January 1978

[SEAL]

Attest:

RUTH C. MASON
*Attesting Officer*

LUTRELLE F. PARKER
*Acting Commissioner of Patents and Trademarks*